(12) United States Patent
Spears

(10) Patent No.: US 6,866,305 B2
(45) Date of Patent: Mar. 15, 2005

(54) PIPE FITTING HAVING STRENGTHENED STARTER THREADS

(75) Inventor: Wayne Spears, Ketchikan, AK (US)

(73) Assignee: Spears Manufacturing Co., Sylmar, CA (US)

(*) Notice: Subject to any disclaimer, the term of this patent is extended or adjusted under 35 U.S.C. 154(b) by 0 days.

(21) Appl. No.: 10/189,702

(22) Filed: Jul. 3, 2002

(65) Prior Publication Data
US 2004/0004354 A1 Jan. 8, 2004

(51) Int. Cl.$^7$ ................................................. F16L 25/00
(52) U.S. Cl. ..................... 285/329; 285/334.4; 285/333; 285/392
(58) Field of Search .................... 285/334.4, 334.1, 285/333, 329, 390, 392

(56) References Cited

U.S. PATENT DOCUMENTS

| | | | |
|---|---|---|---|
| 2,102,072 A | * | 12/1937 | Hinderliter .................. 285/333 |
| 2,104,799 A | * | 1/1938 | Evans ......................... 285/333 |
| 2,179,202 A | * | 11/1939 | Simpson ..................... 285/355 |
| 2,380,690 A | * | 7/1945 | Graham ....................... 285/333 |
| 3,167,333 A | * | 1/1965 | Hall et al. ................... 285/333 |
| 3,545,794 A | | 12/1970 | Wise et al. |
| 3,712,631 A | | 1/1973 | Forchini et al. |
| 4,428,602 A | | 1/1984 | Lambot et al. |
| 4,576,402 A | * | 3/1986 | Murray et al. .............. 285/333 |
| 4,682,797 A | * | 7/1987 | Hildner ........................ 285/40 |
| 4,919,461 A | | 4/1990 | Reynolds |
| 5,083,821 A | * | 1/1992 | Friend ......................... 285/333 |
| 5,109,929 A | | 5/1992 | Spears |
| 5,215,341 A | | 6/1993 | Nakamura et al. |
| 5,437,086 A | * | 8/1995 | Murphree ................. 29/402.13 |
| 5,437,481 A | | 8/1995 | Spears et al. |
| 6,186,558 B1 | * | 2/2001 | Komolrochanaporn . 285/148.19 |
| 6,361,083 B1 | * | 3/2002 | Riesselmann et al. ...... 285/333 |

OTHER PUBLICATIONS

Spears Manufacturing Co. Brochure, "PVC & CPVC Transition Adapters," BR-2-0393, Feb. 1993.
Spears Manufacturing Co. Brochure, "CPVC Schedule 80 and 150 Series Large Diameter Fittings," 800C-0293, Printed 1/93.
Spears Manufacturing Co. Brochure, "CPVC Schedule 80 and 150 Series Large Diameter Fittings," 800C-0293A, Printed 1/93.
Spears Manufacturing Co. Brochure, "BlazeMaster Fire Sprinkler Piping Products" List Price Schedule, FS-1-0592, Printed 4/92.

* cited by examiner

*Primary Examiner*—David E. Bochna
(74) *Attorney, Agent, or Firm*—Denton L. Anderson; Sheldon & Mak

(57) ABSTRACT

A pipe fitting has a body with an internally threaded bore and at least one female starter thread. The at least one female starter thread is disposed either within the bore or immediately outside of the bore. The starter thread is axially aligned with the bore threads. The starter thread is made from a material which is stronger than the material from which the bore threads are made.

28 Claims, 1 Drawing Sheet

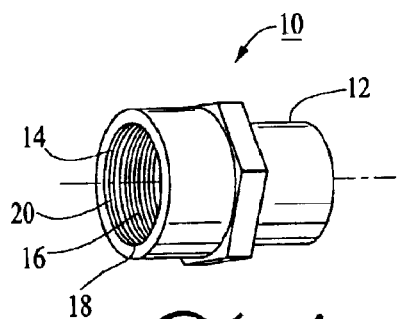
fig.1
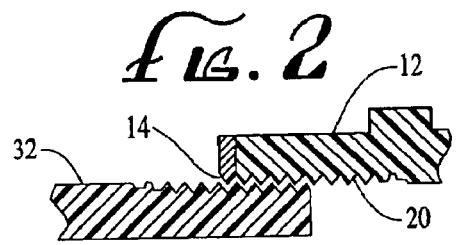
fig.2
fig.3
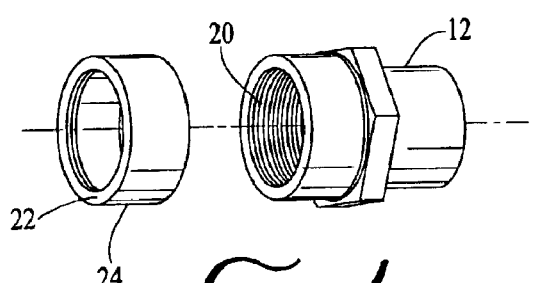
fig.4
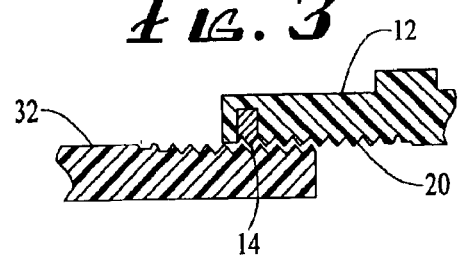
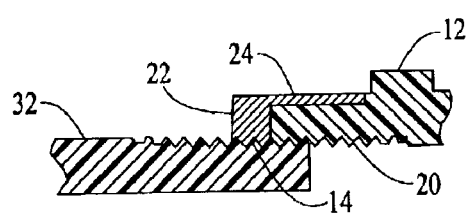
fig.5
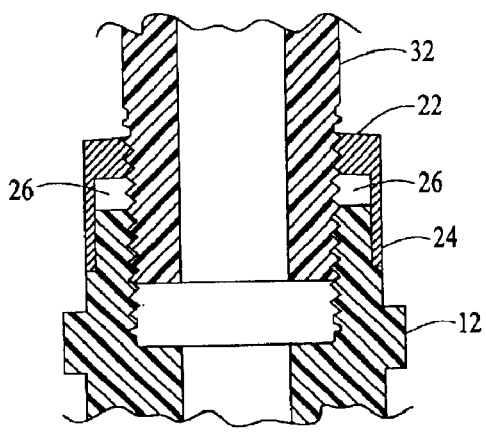
fig.6
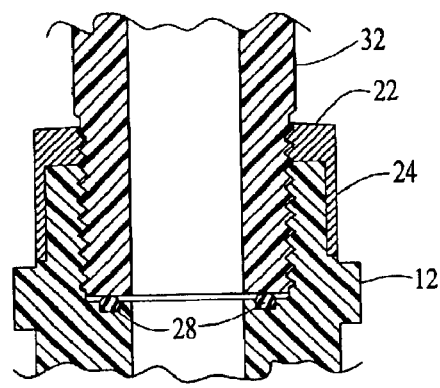
fig.7

PIPE FITTING HAVING STRENGTHENED STARTER THREADS

FIELD OF THE INVENTION

The present invention is directed to pipe fittings.

BACKGROUND OF THE INVENTION

Pipe fittings, including hollow, tubular shaped pipe fittings having connector ends with either internal threads (commonly referred to as female pipe threads) or external threads (commonly referred to as male pipe threads) are exceedingly popular in liquid and gas piping systems. Typically, male pipe threads of a first pipe fitting are threaded into female pipe threads of a second pipe fitting to form a pipe joint.

The use of male and female pipe threads is also exceedingly popular where the pipes and pipe fittings are made from lightweight materials, such as plastics. In such pipes and pipe fittings, however, there is a problem with the use of the pipe fittings. This problem arises from the fact that pipe threads made from lightweight materials have a tendency to "cross thread." That is, if the male pipe threads are not precisely aligned with the female pipe threads as the male pipe threads are initially threaded into the female pipe threads, the male pipe threads can easily become misaligned with the female pipe threads. Such cross-threading tends to ruin one or both sets of pipe threads and cannot seal the pipe joint.

Accordingly, there is a need for a pipe fitting which avoids this problem in the prior art.

SUMMARY

The invention satisfies this need. The invention is a pipe fitting comprising (a) a body having at least one open bore terminating in a bore opening, the bore being internally threaded with internal bore threads, the bore threads being of a first material, and (b) at least one female starter thread disposed either within the bore and being closer to the bore opening than the bore threads or being disposed immediately outside of the bore, the starter thread being axially aligned with the bore threads, the starter thread being of a second material which is stronger than the first material.

DRAWINGS

These and other features, aspects and advantages of the present invention will become better understood with reference to the following description, appended claims and accompanying drawings where:

FIG. 1 is an isometric drawing of a pipe fitting having features of the invention;

FIG. 2 is a detail cross-sectional side view of a first pipe joint using a fitting having features of the invention;

FIG. 3 is a detail cross-sectional side view of a second pipe joint using a fitting having features of the invention;

FIG. 4 is an exploded isometric view of another pipe joint having features of the invention;

FIG. 5 is a detail cross-sectional side view of a pipe joint employing the pipe fitting illustrated in FIG. 4;

FIG. 6 is a detail cross-sectional view of yet another pipe joint having features of the invention; and FIG. 7 is a detail cross-sectional view of still another pipe joint having features of the invention.

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a pipe fitting 10 having an internally threaded body 12 with at least one female starter thread 14.

The body 12 can be any of the myriad of shapes for pipe bodies known in the art. In the drawings, the pipe fitting 10 is a typical swaged pipe coupling for coupling a pipe having external threads of a first diameter with a pipe having external threads of a lesser diameter.

The body 12 has at least one open bore 16 terminating in a bore opening 18. The bore 16 is internally threaded with internal bore threads 20.

The bore threads 20 are of a first material. Typically, the bore threads 20 are of the same material as the body 12, having been formed directly into the internal walls of the bore 16. In most common embodiments, the body 12 is made from a plastic and the bore threads 20 are plastic.

The at least one female starter thread 14 is disposed either within the bore 16 or immediately outside of the bore 16. When disposed within the bore 16, the at least one female starter thread 14 is disposed closer to the bore opening 18 than the bore threads 20. When disposed within the bore 16, the at least one female starter thread 14 is typically molded into the walls of the body 12. Other attachment means, however, can be used.

When the at least one female starter thread 14 is disposed immediately outside of the bore 16, the at least one female starter thread 14 is attached to the body 12 by any suitable connection means. In the embodiment illustrated in FIG. 3, the at least one female starter thread 14 is attached to the body 12 by being molded to the body 12. In the embodiment illustrated in FIG. 2, the at least one female starter thread 14 is attached to the body 12 by adhesives, by welding or by mechanical connection means, such as clamps, clips, threads or press-fit.

In the embodiment illustrated in FIGS. 4 and 5, the at least one female starter thread 14 is disposed in a lip 22 of a band 24 which partially circumscribes that portion of the body 12 defining the open bore 16. This embodiment is ideal for use in a strengthened pipe fitting, such as the pipe fitting described in U.S. Pat. No. 5,582,439, the entirety of which is incorporated herein by this reference.

FIG. 6 illustrates another embodiment of the invention. In FIG. 6, the at least one starter thread 14 is spaced apart from the internal bore threads 20 by a short distance so as to define a gap 26 between the at least one starter thread 14 and the internal bore threads 20. The gap 26 is greater in distance than the distance between adjacent internal bore threads 20.

FIG. 7 illustrates yet another embodiment of the invention. In the embodiment illustrated in FIG. 7, an O-ring or other resilient sealing element 28 is disposed in a shoulder 30 within the bore 16 such that, when a threaded length of pipe 32 is threadily disposed into the bore 16, the forwardmost end of the length of pipe 32 can be disposed in contact with the O-ring or other resilient sealing element 28 so as to further seal the pipe 32 to the fitting 10. The O-ring or other resilient sealing element 28 can have any appropriate shape. Typically, the O-ring or other resilient sealing element 28 has a cross-section which is either round, rectangular or essentially flat.

In all cases, the at least one female starter thread 14 is axially aligned with the bore threads 20 so that the end of an externally threaded pipe end 32 having a matching diameter can be smoothly and properly engaged within the bore threads 20 after initially engaging the at least one starter thread 14.

The at least one starter thread 14 is made from a second material which is stronger than the material of the bore threads 20. By "stronger," it is meant that the material of the at least one starter thread 14 is harder, more rigid or less ductile than the bore threads 20. In one embodiment, the bore threads 20 are made of a first metal and the at least one starter thread 14 is made from a stronger metal. In a typical embodiment, the bore threads 20 are made of plastic and the at least one starter thread 14 is made of a metal. Because the material of the at least one starter thread 14 is stronger than the material of the bore threads 20, the use of the at least one starter thread 14 virtually eliminates the danger of cross-threading.

The at least one starter thread 14 can be relatively small in length. For example, for a one-half inch pipe, the at least one starter thread 14 can be as short as 0.0618 inches. This would provide a "blunt start" as defined by the American Society of Testing Materials ("ASTM"). The length of the at least one starter thread 14 is not particularly important so long as it is not so long as to prevent the engagement of the bore threads 20 with the male threads of the threaded length of pipe 32 which is to be threadily disposed within the bore 16.

The invention provides a pipe fitting which is simple and inexpensive to manufacture and which virtually eliminates cross-threading. The invention can be used with both tapered and straight threads.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A pipe fitting comprising:
   (a) a body having at least one open bore terminating in a bore opening, the bore being internally threaded with internal bore threads, the bore threads being of a first material; and
   (b) at least one female starter thread disposed immediately outside of the bore in a lip of a metal band which partially encompasses the body, the starter thread being axially aligned with the bore threads, the starter thread being of a second material which is stronger than the first material.

2. The pipe fitting of claim 1 wherein the first material is a plastic.

3. The pipe fitting of claim 1 wherein the second material is a metal.

4. The pipe fitting of claim 1 wherein the first material is a plastic and the second material is a metal.

5. The pipe fitting of claim 1 wherein both the first material and the second material are metals.

6. The pipe fitting of claim 1 wherein the at least one starter thread is mechanically attached to the body.

7. The pipe fitting of claim 1 wherein the at least one starter thread is attached to the body by an adhesive.

8. The pipe fitting of claim 1 wherein the at least one starter thread is molded to the body.

9. The pipe fitting of claim 1 wherein the at least one starter thread is spaced apart from the internal bore threads by a distance greater than the distance between adjacent internal bore threads.

10. The pipe fitting of claim 1 having a shoulder within the bore and an O-ring or other resilient sealing element disposed within the shoulder.

11. A pipe fitting comprising:
    (a) a body having at least one open bore terminating in a bore opening, the bore being internally threaded with internal bore threads, the bore threads being of a plastic material;
    (b) at least one female starter thread disposed immediately outside of the bore in a lip of metal band which partially encompasses the body, the starter thread being axially aligned with the bore threads, the starter thread being of a steel material.

12. The pipe fitting of claim 11 wherein the at least one starter thread is mechanically attached to the body.

13. The pipe fitting of claim 11 wherein the at least one starter thread is attached to the body by an adhesive.

14. The pipe fitting of claim 11 wherein the at least one starter thread is molded to the body.

15. The pipe fitting of claim 11 wherein the at least one starter thread is spaced apart from the internal bore threads by a distance greater than the distance between adjacent internal bore threads.

16. The pipe fitting of claim 11 having a shoulder within the bore and an O-ring or other resilient sealing element disposed within the shoulder.

17. A pipe fitting comprising:
    (a) a body having at least one open bore terminating in a bore opening, the bore being internally threaded with internal bore threads, the bore threads being of a first material; and
    (b) at least one female starter thread disposed immediately outside of the bore and molded to the body, the starter thread being axially aligned with the bore threads, the starter thread being of a second material which is stronger than the first material.

18. The pipe fitting of claim 17 wherein the first material is a plastic.

19. The pipe fitting of claim 17 wherein the second material is a metal.

20. The pipe fitting of claim 17 wherein the first material is a plastic and the second material is a metal.

21. The pipe fitting of claim 17 wherein both the first material and the second material are metals.

22. The pipe fitting of claim 17 wherein the at least one starter thread is spaced apart from the internal bore threads by a distance greater than the distance between adjacent internal bore threads.

23. The pipe fitting of claim 17 having a shoulder within the bore and an O-ring or other resilient sealing element disposed within the shoulder.

24. A pipe fitting comprising:
    (a) a body having at least one open bore terminating in a bore opening, the bore being internally threaded with internal bore threads, the bore threads being of a plastic material;
    (b) at least one female starter thread disposed immediately outside of the bore and molded to the body, the starter thread being axially aligned with the bore threads, the starter thread being of a steel material.

25. The pipe fitting of claim 24 wherein the at least one starter thread is spaced apart from the internal bore threads by a distance greater than the distance between adjacent internal bore threads.

26. The pipe fitting of claim 24 having a shoulder within the bore and an O-ring or other resilient sealing element disposed within the shoulder.

27. A pipe fitting comprising:
(a) a body having at least one open bore terminating in a bore opening, the bore being internally threaded with internal bore threads, the bore threads being of a first material; and
(b) at least one female starter thread disposed immediately outside of the bore and attached to the body by an adhesive, the starter thread being axially aligned with the bore threads, the starter thread being of a second material which is stronger than the first material.

28. A pipe fitting comprising:
(a) a body having at least one open bore terminating in a bore opening, the bore being internally threaded with internal bore threads, the bore threads being of a plastic material;
(b) at least one female starter thread disposed immediately outside of the bore and attached to the body by an adhesive, the starter thread being axially aligned with the bore threads, the starter thread being of a steel material.

* * * * *